May 3, 1955 O. HROMATKA ET AL 2,707,683
METHOD FOR THE PRODUCTION OF VINEGAR ACIDS
BY OXIDATIVE FERMENTATION OF ALCOHOLS
Filed Dec. 11, 1951
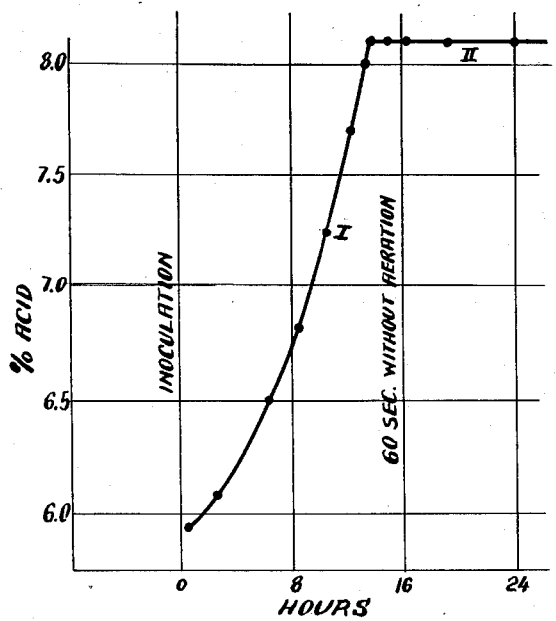
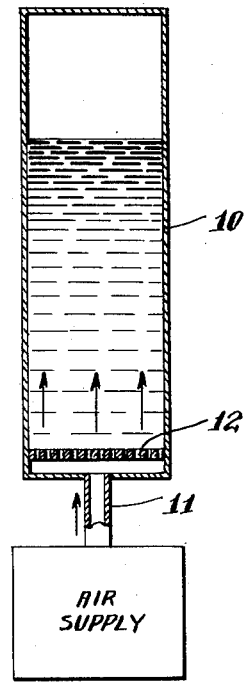
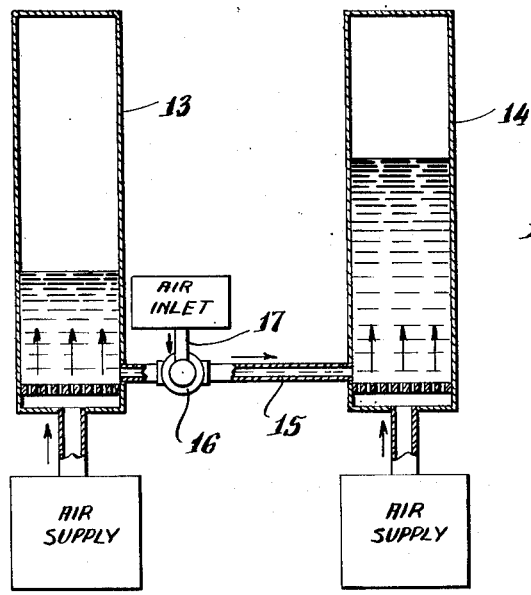
INVENTOR.
OTTO HROMATKA
HEINZ EBNER
BY
Haseltine, Lake + Co.
AGENTS.

United States Patent Office 2,707,683
Patented May 3, 1955

2,707,683

METHOD FOR THE PRODUCTION OF VINEGAR ACIDS BY OXIDATIVE FERMENTATION OF ALCOHOLS

Otto Hromatka, Salzburg, and Heinz Ebner, Linz, Austria

Application December 11, 1951, Serial No. 261,002

Claims priority, application Austria May 3, 1949

10 Claims. (Cl. 99—147)

The present invention relates generally to the production of carboxylic acids and is particularly directed to the production of acetic acid or vinegar by oxidative fermentation of alcohol, and is a continuation in part of our abandoned application Serial No. 154,734, filed April 7, 1950.

Prior to the present invention two methods have been principally employed for the commercial production of acetic acid by oxidative fermentation of alcohol. According to one of these existing methods, in use from ancient times until today, the oxidizing micro-organisms, which are a species of acetobacteria, are deposited or settled upon the surface of an alcohol containing liquid in the form of a more or less cohesive film. Since the acetobacteria employed are aerobic, that is, capable of continued life and activity only in the presence of oxygen, they are effective to oxidize the alcohol to acetic acid only at the surface of the liquid exposed to the atmosphere or to any other oxygen containing gas. The relatively small ratio of the surface area to the total volume of the liquid accounts for the low rate of acidification realized with the surface method of fermentation. Since the rate of acidification is low, the process must extend over a relatively long period so that the losses of alcohol and acetic acid by volatilization or evaporation are necessarily high and the actual yield may thereby be reduced to as low as 50% of the output that might be theoretically anticipated. Thus, the method of surface fermentation may require from several weeks to as long as a few months to convert wine, containing 5 to 12% of alcohol, into vinegar. Further, since only the bacteria at the surface of the alcohol containing charge are supplied with oxygen, attempts to increase the quantity of the charges, and the depth thereof, result in the occurrence of anaerobic, defective fermentation in the lower layers of the charge, which defective fermentation impairs the odor and taste of the vinegar.

The above disadvantages of the surface fermentation method are in part avoided by the other of the methods commonly in use, called the quick vinegar process, and wherein the alcohol containing liquid, or mash, is trickled down through a column of beechwood shavings, husks of grapes or other similar carriers having a large surface area on which the acetobacteria are deposited, while air is simultaneously passed upwardly through the carrier. The relatively large ratio of the effective surface area of the carrier in relation to the volume of the alcohol containing liquid and to the dimensions of the required apparatus permit a reduction of the fermentation period to one to two weeks and an improvement in the yield or efficiency is realized. This process has for most part replaced the surface fermentation method in the commercial production of vinegar, however, it too has certain substantial disadvantages and defects. The volume of the carrier material is approximately twice the volume of the vinegar produced during the period of fermentation, so that the apparatus employed must be three times as large as the volume of the yield. In order to produce the constant trickling of the liquid over the carrier material, acid-proof pumps, which are both expensive and difficult to maintain, must be employed. Further, the configuration of the pieces of carrier material is a compromise between that providing the maximum surface area and the requirement for sufficient strength so that the column will not immediately become packed and non-porous so that extreme care must be employed in preparing the carrier material. In any event, the lower zones of the column of carrier material do become compressed and packed during continuous operation so that the effective surface area is gradually reduced to produce a corresponding decrease in the rate of acidification.

Since the optimum temperature range for the action of the acetobacteria is very narrow, and overheating of only a few degrees above the upper limits of this range, and for only a very brief time, kills the bacteria and produces a decrease in the rate of acidification, the temperature must be very closely controlled and, in the quick vinegar process this control is exercised by varying the temperature in the chamber containing the carrier column. However, since this chamber is not homogeneous, and the control must be based upon the temperatures at certain control or check points, it is practically impossible to maintain all points in the chamber at a completely uniform temperature. Thus, local overheating at one of the check points will effect a lowering of the temperature in the rest of the apparatus below that at which the optimum efficiency is obtained, while overheating in an area remote from the check points will go unnoticed and may kill the acetobacteria in that remote area so that the potency of the acetobacteria, and the acidification effect, in the various portions of the carrier material column will not be uniform. While the destruction of the bacteria may be accomplished by overheating, or other causes, in but a few minutes, the renewed settlement of active bacteria on the carrier material and the increase of the acidification effect up to the original rate may require as much as a week.

Since the carrier material column cannot be sterilized before renewing the inoculation of acetobacteria, or otherwise treated in the event that contamination by foreign bacteria or poisonous matter occurs, removal and replacement of the carrier material must be periodically effected. Furthermore, the adsorptive properties of the carrier material prevent the use of additive substances which are effective to increase the rate of bacteria growth.

As still another disadvantage of the quick vinegar process, it should be noted that the carrier material adsorbs a quantity of liquid substantially equal to the quantity of liquid consumed during the fermentation period. Thus, if the same apparatus is employed in producing different kinds of vinegar in successive fermentation periods, the vinegar first produced will remain in the carrier material to dilute or mix with that produced in a subsequent fermentation period.

Finally, if mashes, having a low alcohol content and a relatively large content of dissolved non-volatile compounds are fermented according to the quick vinegar process, the carrier material is found to become slimy during the continuous operation so that the effective surface area is progressively reduced and increasing portions of the column of carrier material are made impervious to the counter-current travel of the mash and air to gradually reduce the acidification effect until the process is brought to a halt. Then it becomes necessary to replace the carrier material and to restart the acidification process, operations that are costly and time consuming. Thus, it is not possible to ferment certain materials, such as, fruit wine, cider, malt-waste by a continuously operated quick vinegar process.

The primary object of the present invention is to provide a method and apparatus for the production of carboxylic acids, such as, acetic acid or vinegar, by oxidative fermentation of alcohols wherein the above mentioned disadvantages of the previously used processes are avoided.

Another object is to provide a method of the described character wherein the carboxylic acids are produced by an oxidative submerged fermentation of a mash or substrate containing primary alcohols in aqueous solutions in which oxygen containing gases are uninterruptedly, with regard to time and place, introduced into the substrate during the entire period of fermentation.

The above and other objects, features and advantages of the present invention will be apparent in the following detailed description of preferred embodiments and examples thereof which is to be read in connection with the accompanying drawing forming a part hereof and wherein:

Fig. 1 is graphical representation of the relationship between the acidification and time in a process embodying the present invention, and particularly demonstrates the effect of even a momentary interruption of the supply of oxygen;

Fig. 2 is a diagrammatic view of apparatus employed in practicing the process embodying the present invention; and Fig. 3 is a diagrammatic view of apparatus employed in practicing a continuously operated process according to another embodiment of the present invention.

While it has previously been proposed to produce carboxylic acids by the submerged fermentation of substrates containing primary alcohols, for example, the process and apparatus disclosed in United States Letters Patent No. 181,999, Tait et al., issued September 5, 1876, no commercially useful results were obtained from such suggestions. It remained for us to realize that acetobacteria, when distributed in a submerged state in substrates containing sufficient concentrations of primary alcohols and corresponding carboxylic acids, are extremely and critically sensitive toward any, even transitory, lack of oxygen.

In the process of Tait et al., the system is closed and the same air is repeatedly circulated in the form of currents of hot air passing through the central portion of the substrate containing vessel until all of the oxygen is exhausted. Thus, even though the substrate may be agitated by the air currents, the agitated substrate will alternate between areas of the vessel that are inadequately aerated and the central portion through which the air currents pass. Further, as the oxygen is progressively exhausted from the recirculated air, inadequate oxygen will be available to sustain the aerobic acetobacteria. These features of the prior apparatus and process cause the destruction of the acetobacteria so that the rate of fermentation is very low and this defect is the reason for the failure of the process and apparatus of Tait et al. to replace the surface fermentation and quick vinegar processes even though the Tait et al. proposals were made many years ago.

Our invention involves the discovery of important reasons for the previous lack of practical success, and provides the solution by introducing fresh oxygen containing gases uninterruptedly during the entire period of fermentation, with the oxygen being introduced into the substrate in a manner to continuously expose all areas thereof to the oxygen so that growth of the acetobacteria is uniformly promoted throughout the substrate.

This process according to the present invention involves the introduction of a substrate containing alcohol and a nutrient substance into a vertically elongated column or tower 10 (Fig. 2). Any of the aqueous solutions of primary alcohols, such as, for example, ethyl alcohol, butyl alcohol, fermentation amyl alcohol, glycol, amino alcohols and the like, may be used as the substrate in concentrations permitting the growth of micro-organisms. In producing acetic acid, any of the mashes containing ethyl alcohol, such as, for example, diluted brandy (ethyl alcohol) which has been more or less purified, wine, fruit-wine, cider, malt-waste beer and the like, are particularly suited as substrates.

The tower 10 is provided with a conduit 11 opening into the bottom thereof and through which oxygen containing gas is supplied continuously during the entire fermentation period. A porous plate 12 extends across the lower end of the tower 10 and is formed with closely and uniformly spaced minute openings through which the oxygen containing gas is passed so that all portions of the substrate are continuously and uniformly aerated during the entire fermentation period.

The fermentation is initiated by inoculating the substrate with active bacteria of vinegar. The inoculating substance may be in the form of mashes which are in a full state of submerged fermentation, or bacteria deposited upon a chain of suitable carrier material which is dipped into the substrate.

A first specific example of our invention follows:

3500 ccm. of a mash of wine, containing approximately 5.91 gms. of acetic acid per 100 ccm. of mash and approximately 3.48% by volume of alcohol, are employed as the substrate and are placed in a fermentation tower, formed by a glass tube 3 m. in height and 45 mm. in diameter and having a glass air distributing plate extending across the bottom with pores or openings of 5 to 15 microns.

Air is supplied continuously for passage through the distributing plate at the rate of 20 litres per hour and at a temperature of 30° C. The fermentation is initiated by inoculating the substrate with 640 gms. of beechwood shavings, weighed in the moist condition, and settled with bacteria taken from a quick vinegar apparatus during a fermentation period in which wine vinegar is being produced from wine. The shavings are strung on a thread to form a chain which is suspended in the substrate.

A slow fermentation commences and the rate of fermentation accelerates so that, after 16 hours, the beechwood shavings are removed from the substrate without interrupting the aeration. Upon the removal of the inoculating substance, the rate of fermentation or acidification first decreases almost to zero. Suddenly, however, the rate of fermentation shows a marked and rapid increase so that, after an additional 68 hours, all of the alcohol contained in the substrate has been converted into acetic acid. In order to maintain the oxygen supply at the level necessary to sustain the increasing number of bacteria, the rate of air supply is increased to 40 litres per hour 57 hours after the beechwood shavings have been removed.

In order to demonstrate the effect of an interruption of the air supply, for even a relatively short period, reference is made to the graph of Fig. 1 wherein the ordinates represent the percent of acid in the substrate and the abscissas represent the time since the beginning of the fermentation period. Using the apparatus described in connection with the first example above, 2320 ccm. of the mash there specified was aerated with air at a temperature of 30° C. at the rate of 40 litres per hour and inoculated with a mash of wine already fermenting in a submerged state. The submerged acetic acid fermentation increases the acid content of the substrate at an increasing rate, as the number of bacteria grows, as shown by the exponential curve I. After approximately 14 hours, at which point the formation of acid was at the rate of .31 gm. of acetic acid per 100 ccm. of substrate per hour, the air supply was interrupted for 60 seconds, and then again continued. As seen in Fig. 1, after the interruption of the air supply for 60 seconds, the percent of acid remained constant, part II of the curve, and it was found that this halt in the process was due to the complete destruction of the bacteria as a result of the short cessation of the air supply. Thus, the importance of the uninterrupted supply of air, both with respect to time and place, is clearly demonstrated.

In order to demonstrate the application of the invention to circumstances other than those previously specified, the following additional examples are set forth:

Second example

Using apparatus substantially like that described in the first example, a substrate of 3000 ccm. of a mash of wine, containing 1.87 gms. of acetic acid per 100 ccm. and 6.90% by volume of ethyl alcohol, is inoculated with 600 ccm. of an aerated mash of wine fermenting in a submerged state and containing 6.75 gms. of acetic acid per 100 ccm. and 3.25% by volume of alcohol, the rate of acidification of the inoculating mash being 13.32 gms. of acetic acid per 100 ccm. per 24 hours. The inoculated substrate is uninterruptedly aerated with air initially delivered at the rate of 10 litres per hour and then stepwise increased finally to 60 litres per hour after the fermentation period has proceeded for 18 hours.

At the beginning, the fermentation of the substrate is at the rate of 1.34 gms. of acetic acid per 100 ccm. per 24 hours and increases exponentially up to 18.47 so that within 20 hours the entire alcohol content is converted into acetic acid, the yield being 96% and the temperature of the fermenting liquid 31° C.

Since the inoculation in this example is performed with an aerated mash of wine fermenting in a submerged state, it is necessary to maintain the continuous aeration of the inoculating mash during its transfer to the tower in which the substrate to be fermented is contained. Therefore, the apparatus used, when the inoculation in the above manner, is a modification of that in Fig. 2, and, as seen in Fig. 3, includes two towers 13 and 14, each of which is the same as the tower 10, and a connecting conduit 15 extending from the tower 13 to the tower 14 and having a pump 16 located therein for transferring the inoculating mash from tower 13 to tower 14 in which the substrate is contained. In order to prevent the destruction of the bacteria in the inoculating mash during its travel through the conduit 15, the pump 16 is provided with an air inlet 17 for aerating the inoculating mash during such travel.

It is apparent that, with the apparatus of Fig. 3, a continuous process may be set up in which a portion of the aerated mash fermenting in a submerged state in tower 13 is first used for initiating the fermenting process in tower 14 and then, after the fermentation process has been completed in tower 14, the mash of tower 14 is employed for inoculating a fresh charge of substrate in tower 13.

Third example

Using the apparatus described in connection with the second example, 2500 ccm. of a mash of sulphite spirit containing 5.83% by volume of ethyl alcohol and 0.13% by volume of methyl alcohol are inoculated with 500 ccm. of an aerated mash containing 4.81 gms. of acetic acid per 100 ccm. and 0.91% by volume of ethyl alcohol and fermenting in a submerged state at an acidification rate of 19.20 gms. of acetic acid per 100 ccm. per 24 hours and have nutrients added thereto in the form of .40% cornsteep liquor solids. The substrate is uninterruptedly aerated at a rate beginning at 5 litres of air per hour and increasing as the number of bacteria increase up to 50 litres per hour. After 14 hours both alcohols are fermented and the solution obtained contains 5.53 gms. of acetic acid per 100 ccm. After the acetic acid bacteria has been separated, a vinegar suitable for human consumption is obtained.

Fourth example

Using the apparatus described in connection with the second example, 3000 ccm. of wine having 0.47 gm. of acetic acid per 100 ccm. and 7.98% by volume of alcohol are inoculated with 700 ccm. of an aerated mash of wine containing 5.0 gms. of acetic acid per 100 ccm. and 3.0% by volume of alcohol and fermenting in a submerged state at an acidification rate of 4.0 gms. of acetic acid per 100 ccm. per 24 hours. The uninterrupted aeration commences at the rate of 5 litres of air per hour and increases during the first 12 hours up to a rate of 30 litres per hour, while the rate of acidification of the substrate, during the same period, increases exponentially from 0.48 to 10.0 gms. of acetic acid per 100 ccm. per 24 hours. After the fermentation has proceeded for 12 hours, the aeration is switched, without interruption, from air to a gas mixture of 30% oxygen and 70% nitrogen and this gas mixture is introduced at the rate of 33 litres per hour continuously to effect still further increases in the rate of acidification until oxidation of the alcohol has been completed at the end of 22 hours. During the fermentation, the substrate is maintained at a temperature of 31° C.

Since the present process may be carried on in a container or tower which is free of internal obstructions, as contrasted with the carrier material of the quick vinegar process, and since the air or other oxygen containing gas is supplied uniformly to each and every bacteria within the substrate, there is no possibility for local overheated areas to develop, and control of the temperature of the fermenting mash may be easily controlled. Thus, the bacteria contained in the inoculation are caused to multiply and concurrently increase the rate of acidification. While specific amounts of the inoculating substances have been set forth in the foregoing examples, these amounts are not limiting and it is only necessary to supply sufficient bacteria in the inoculation so that the maximum rate of acidification attainable with the apparatus and the particular substrate being fermented will be reached within a few hours after the commencement of the process. When this is done, the losses due to evaporation are much smaller than in the case of other processes requiring several days or weeks for completion, and therefore yields of up to 95% of the theoretical output have been obtained with the present process in fermenting substrates containing ethyl alcohol. Further, an increase of the partial pressure of the oxygen increases the rate of the reaction and thereby additionally improves the attainable yield or efficiency.

While the apparatus of Fig. 3 is peculiarly adapted to use in a continuous process, the apparatus of Fig. 2 may be similarly employed by utilizing a portion of the still fermenting substrate from a previous batch, having a high rate of acidification, as the inoculating substance for a fresh batch of substrate which is added thereto as the aeration continues uninterruptedly.

Without in any way defining an upper limit on the relative effectiveness of the process embodying the present invention, we point out that a maximum increase of the acid content of 0.5% per hour has been obtained in an acetic fermentation conducted in accordance with our process and this is approximately 10 times the maximum acidification effect normally anticipated with a quick vinegar process. Taking into account the more efficient utilization of the volume of the apparatus, due to the elimination of the column of carrier material, it is to be expected that a process embodying the present invention will produce 20 times the output of that obtained by the quick vinegar process in an apparatus of the same size and during the same period of fermentation.

While we have shown and described specific apparatus with which the process according to the present invention may be conveniently practiced, it is to be understood that the invention is not limited to that specific structure, and that other forms may be employed so long as they are effective to cause the uninterrupted aeration of all of the bacteria during the entire fermentation period.

Further, while specific examples of the process have been given above, such examples are merely illustrative

What is claimed is:

1. A process for the production of vinegar by a submerged oxidative fermentation of a liquid comprising ethyl alcohol in aqueous solution by means of acetobacteria, comprising the steps of continuously forcing fine bubbles of fresh air uniformly through every part of the fermentation solution uninterruptedly during the entire period of fermentation, to thereby avoid interrupting at any time the supply of oxygen to the acetobacteria and to avoid the creation of any unoxygenated zones within the fermentation solution wherein the acetobacteria may be killed during passage of short duration through the zone, and continuously exhausting the spent air from the solution.

2. A process for the production of high percentage concentration vinegar by a submerged oxidative fermentation of a liquid comprising ethyl alcohol in aqueous solution by means of acetobacteria, said process comprising the steps of establishing a column of an aqueous fermentation solution having a total concentration of ethyl alcohol and acetic acid of at least five percent, continuously forcing fine bubbles of fresh air uniformly through every part of the fermentation solution uninterruptedly during the entire period of fermentation, to thereby avoid interrupting at any time the supply of oxygen to the acetobacteria and to avoid the creation of any unoxygenated zones within the fermentation solution wherein the acetobacteria may be killed during a passage of short duration through the zone, and continuously exhausting the spent air from the solution.

3. A process as described in claim 2 wherein the bubbles of fresh air forced through the solution are initially of a diameter of from 5 to 15 microns.

4. A process as claimed in claim 2 in which the fermentation liquid is a mash containing ethyl alcohol.

5. A process as claimed in claim 4 wherein the ethyl alcohol containing mash is produced in the from of a liquid obtained by alcoholic fermentation.

6. A process as claimed in claim 2 wherein the fermentation liquid is produced by diluting ethyl alcohol with water.

7. A process as claimed in claim 2 wherein the fermentation liquid comprises a mixture of methyl and ethyl alcohols, the ethyl alcohol being present in the predominant amount.

8. A process as claimed in claim 2 wherein the fermentation liquid is inoculated by adding the same to a solution already fermented according to the process of claim 2, and continuously forcing fine bubbles of fresh air uniformly through every part of the mixtures of the solutions uninterruptedly during the entire ensuing period of fermentation, to thereby avoid interrupting at any time the supply of oxygen to the acetobacteria and to avoid the creation of any unoxygenated zones within the fermentation mixture wherein the acetobacteria may be killed during the passage of short duration through the zone, and continuously exhausting the spent air from the mixture.

9. A process as claimed in claim 2 wherein the acetified solution is removed continuously and in which the said column of aqueous fermentation solution is continuously replenished in corresponding amounts.

10. A process as claimed in claim 2 wherein the partial pressure of the oxygen in the air forced through the fermentation solution is greater than the partial pressure of oxygen in the ambient atmosphere.

References Cited in the file of this patent

UNITED STATES PATENTS

| Number | Name | Date |
|---|---|---|
| 181,999 | Tait et al. | Sept. 5, 1876 |
| 1,732,921 | Bratton | Oct. 22, 1929 |
| 1,908,225 | Currie | May 9, 1933 |
| 2,006,080 | May | June 25, 1935 |
| 2,043,940 | Van Thiel | June 9, 1936 |
| 2,077,652 | Wessblad et al. | Apr. 20, 1937 |
| 2,118,370 | Wessblad et al. | May 24, 1938 |
| 2,207,768 | Weijlard et al. | July 16, 1940 |
| 2,277,716 | Lockwood | Mar. 31, 1942 |
| 2,338,228 | Boeckeler et al. | Jan. 4, 1944 |